United States Patent
Wakamatsu et al.

(10) Patent No.: US 9,181,831 B2
(45) Date of Patent: Nov. 10, 2015

(54) SELECTIVE CATALYTIC REDUCTION SYSTEM

(75) Inventors: Toshitsugu Wakamatsu, Fujisawa (JP); Norio Kawanaka, Fujisawa (JP); Hiroshi Kataoka, Fujisawa (JP); Mamoru Komine, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 464 days.

(21) Appl. No.: 13/699,498

(22) PCT Filed: May 16, 2011

(86) PCT No.: PCT/JP2011/061211
§ 371 (c)(1), (2), (4) Date: Nov. 21, 2012

(87) PCT Pub. No.: WO2011/148808
PCT Pub. Date: Dec. 1, 2011

(65) Prior Publication Data
US 2013/0064719 A1  Mar. 14, 2013

(30) Foreign Application Priority Data
May 25, 2010 (JP) ................ 2010-119712

(51) Int. Cl.
| F01N 3/18 | (2006.01) |
| F01N 3/10 | (2006.01) |
| B01D 53/94 | (2006.01) |
| F01N 3/20 | (2006.01) |
| F01N 11/00 | (2006.01) |
| F01N 13/00 | (2010.01) |

(52) U.S. Cl.
CPC *F01N 3/18* (2013.01); *F01N 3/208* (2013.01); *F01N 11/002* (2013.01); *F01N 13/009* (2014.06); *F01N 2550/05* (2013.01); *F01N 2610/02* (2013.01); *F01N 2610/1493* (2013.01); *F01N 2900/08* (2013.01); *F01N 2900/1811* (2013.01); *Y02T 10/24* (2013.01); *Y02T 10/47* (2013.01)

(58) Field of Classification Search
None
See application file for complete search history.

(56) References Cited

FOREIGN PATENT DOCUMENTS
| JP | 2000-303826 | 10/2000 |
| JP | 2005-113688 | 4/2005 |
| JP | 2005-273503 | 10/2005 |

OTHER PUBLICATIONS

Hiroki (JP2005-113688A) (2005)—specification machine translated.*

(Continued)

*Primary Examiner* — Tom P Duong
*Assistant Examiner* — Jelitza Perez
(74) *Attorney, Agent, or Firm* — Staas & Halsey LLP

(57) ABSTRACT

A selective catalytic reduction (SCR) system that can suppress thermal damage in operation of a dosing valve resulting from crystallization of urea solution and corrosion of the dosing valve to perform proper urea solution injection control, and includes an SCR device provided in an exhaust pipe of an engine; a dosing valve that injects urea solution at an upstream side of the SCR device; a minimum injection quantity setting unit that if temperature of the dosing valve is equal to or higher than a predetermined temperature, sets a minimum injection quantity according to the temperature of the dosing valve; and an urea solution injection control unit that if injected quantity of urea solution according to quantity of $NO_x$ emitted from the engine is smaller than the minimum injection quantity, controls the injected quantity of urea solution to be the minimum injection quantity.

5 Claims, 5 Drawing Sheets

(56) References Cited

OTHER PUBLICATIONS

Patent Abstracts of Japan, Publication No. 2000-303826, Published Oct. 31, 2000.
Patent Abstracts of Japan, Publication No. 2005-113688, Published Apr. 28, 2005.
Patent Abstracts of Japan, Publication No. 2005-273503, Published Oct. 6, 2005.
Written Opinion of the International Searching Authority mailed Jul. 26, 2011 in corresponding International Application No. PCT/JP2011/061211.

* cited by examiner

FIG.4
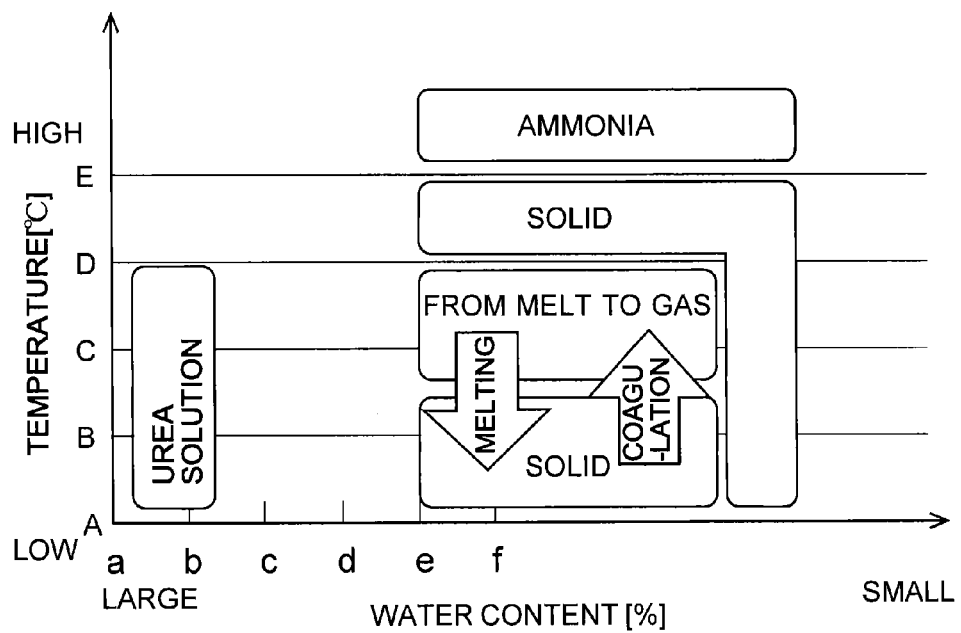
FIG.5(a)　　　FIG.5(b)　　　FIG.5(c)
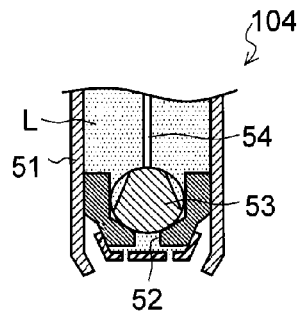 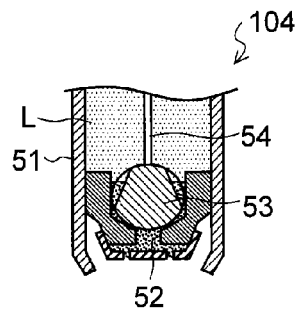 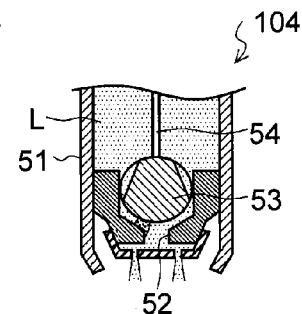

SELECTIVE CATALYTIC REDUCTION SYSTEM

CROSS-REFERENCE TO RELATED APPLICATIONS

This application claims the benefit of Japanese Patent Application No. 2010-119712, filed on May 25, 2010, the contents of which is incorporated herein by reference, which serves as priority for PCT Application No. PCT/JP2011/061211, filed May 16, 2011.

TECHNICAL FIELD

The present invention relates to a selective catalytic reduction ("SCR") system that reduces $NO_x$ in an exhaust gas from an engine using urea solution.

BACKGROUND ART

As an exhaust gas purification system for purifying $NO_x$ in an exhaust gas from a diesel engine, an SCR system using an SCR (selective catalytic reduction) device has been developed.

The SCR system supplies urea solution to an exhaust gas upstream of the SCR device to generate ammonia using heat of the exhaust gas, and using the ammonia, reduces $NO_x$ on an SCR catalyst to purify $NO_x$ (see, for example, patent literature 1).

As illustrated in FIG. 4, upon urea solution reaching a temperature equal to or exceeding its boiling point, water in the urea solution starts to evaporate, and as a result, the urea solution turns into a melt, through which a gas is generated. The generated gas, upon its temperature being raised, is crystallized, resulting in generation of a solid. Upon the generated solid subliming, ammonia is generated. Also, the generated melt and/or gas are partially hydrolyzed with water vapor, generating ammonia and carbon dioxide.

Urea solution is injected from a dosing valve (urea injection device or dosing module) provided on the upstream side of the SCR device.

As illustrated in FIG. 5(a), a dosing valve 104 has a structure in which a cylinder 51 filled with high-pressure urea solution L is provided with an injection orifice 52 and a valving element 53 occluding the injection orifice 52 is attached to a plunger 54, and upon energization of a coil (not illustrated) to pull up the plunger 54, the valving element 53 is moved away from the injection orifice 52, whereby urea solution L is injected. Upon the energization of the coil being stopped, the plunger 54 is pulled down by means of an internal spring force so that the valving element 53 occludes the injection orifice 52, whereby the injection of urea solution L is stopped.

The dosing valve 104 is provided in an exhaust pipe for an engine, the exhaust pipe allowing a high-temperature exhaust gas to flow therein. Upon the dosing valve 104 heated to a high temperature, the urea solution L in the dosing valve 104 also has a high temperature, and disadvantageously, proper urea solution injection control may not be performed as a result of the dosing valve 104 having a failure in operation, e.g., the urea solution L in the dosing valve 104 being crystallized, resulting in fixation of the plunger as illustrated in FIG. 5(b) or a solid body resulting from the crystallization of the urea solution L being stuck between the valving element 53 and the cylinder 51 (valve seat) as illustrated in FIG. 5(c), disabling injection of urea solution L to be stopped.

Furthermore, a corrosive intermediate product (ammonium carbamate) is disadvantageously generated in a process of generating ammonia from urea solution and the corrosive intermediate product corrodes the inside of the dosing valve.

Furthermore, when urea solution in the dosing valve is heated to a high temperature, parts made of rubber or resins, which are used in the dosing valve, may disadvantageously be damaged. In the present description, these troubles are collectively referred to as thermal damage.

In order to prevent such thermal damage, cooling water for cooling an engine is made to pass through a dosing valve to cool the dosing valve by means of the cooling water.

CITATION LIST

Patent Literature 1: Japanese Patent Laid-Open No. 2000-303826

Even in the case where a dosing valve is cooled by cooling water as stated above, however, if an injected quantity of urea solution (abscissa axis) is decreased or injection of urea solution is stopped, as seen in FIG. 6, a temperature of the urea solution (ordinate axis) in the dosing valve becomes high, resulting in the problem of occurrence of thermal damage such as a failure in operation and/or corrosion of the dosing valve. A reason for this may be considered as follows: when an injected quantity of urea solution is reduced, urea solution supplied to the dosing valve is also reduced, disabling obtainment of a sufficient cooling effect provided by the supplied urea solution.

SUMMARY OF THE INVENTION

Therefore, an object of the present invention is to solve the above problem and provide an SCR system that can suppress thermal damage such as a failure in operation of a dosing valve resulting from crystallization of urea solution and/or corrosion of the dosing valve to perform proper urea solution injection control.

The present invention has been made in order to achieve the above object, and provides an SCR system including: an SCR (selective catalytic reduction) device provided in an exhaust pipe for an engine; a dosing valve that injects urea solution on an upstream side of the SCR device; and a urea solution injection control unit that controls an injected quantity of urea solution according to a quantity of $NO_x$ emitted from the engine, wherein the SCR system includes a minimum injection quantity setting unit that if a temperature of the dosing valve is equal to or higher than a predetermined temperature, sets a minimum injection quantity according to the temperature of the dosing valve; and wherein the urea solution injection control unit is configured to, if the injected quantity of urea solution according to the quantity of $NO_x$ emitted from the engine is smaller than the minimum injection quantity set by the minimum injection quantity setting unit, control the injected quantity of urea solution to be the minimum injection quantity.

The minimum injection quantity setting unit may include: a load state determination unit that determines whether an operation state of the engine is a high-load operation state or a low-load operation state; and a high-load minimum injection quantity setting unit that if the load state determination unit determines that the operation state of the engine is a high-load operation state, sets a high-load minimum injection quantity so as to satisfy expression (1) below:

$$x_4 \geq (y_0 - ax_1 - bx_2 - cx_3 - e)/d \quad (1),$$

where $x_1$ is an exhaust gas flow,
$x_2$ is an exhaust gas temperature,
$x_3$ is a cooling water temperature,
$y_0$ is a urea solution temperature at which no trouble occurs, and
a to e are coefficients.

The load state determination unit, if a fuel injection quantity is equal to or exceeds a fuel injection quantity threshold value calculated from the exhaust gas temperature, may determine that the operation state of the engine is a high-load operation state, and if the fuel injection quantity is less than the fuel injection quantity threshold value, determine that the operation state of the engine is a low-load operation state.

The SCR system may further includes a minimum injection quantity setting condition determination unit that permits the setting of the minimum injection quantity by the minimum injection quantity setting unit only if a predetermined minimum injection quantity setting condition is met, and if the setting of the minimum injection quantity is not permitted, the minimum injection quantity setting unit may set the minimum injection quantity to 0 (zero).

The present invention enables provision of an SCR system that can suppress thermal damage such as a failure in operation of a dosing valve resulting from crystallization of urea solution and/or corrosion of the dosing valve to perform proper urea solution injection control.

BRIEF DESCRIPTION OF DRAWINGS

FIG. 4 is a diagram illustrating states of urea solution relative to temperatures and water contents.

FIG. 5 includes cross-sectional views of a dosing valve: FIG. 5(a) indicates a normal case, and FIGS. 5(b) and 5(c) each indicates a case of occurrence of a trouble.

DETAILED DESCRIPTION

Preferred embodiments of the present invention will be described below with reference to the drawings.

First, an SCR system to be installed in a vehicle will be described.

Figure 1A:
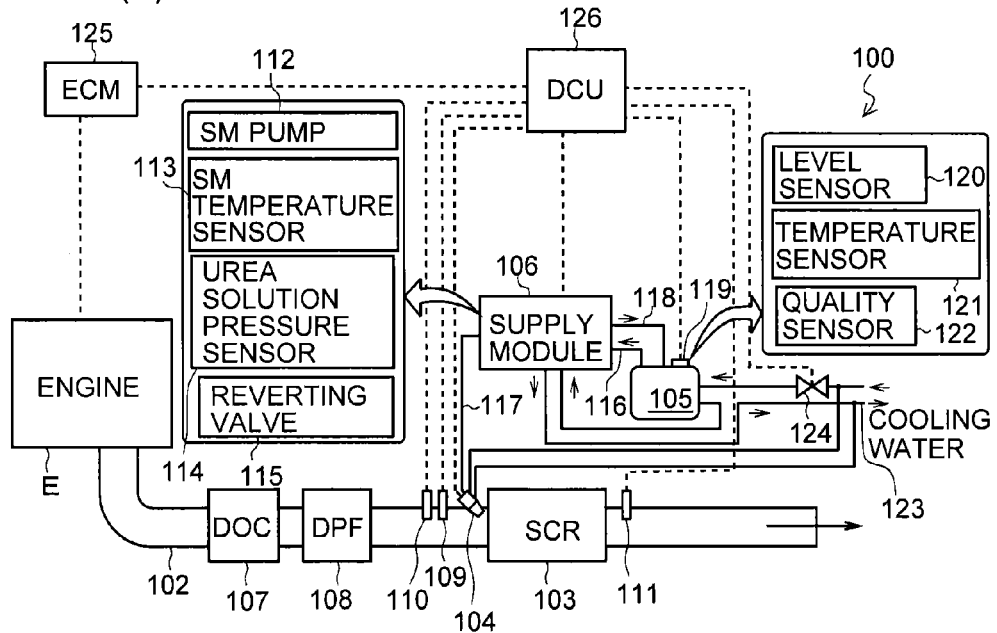
FIGS. 1(a) and (b) are diagrams each illustrating a schematic configuration of an SCR system according to an embodiment of the present invention.

As illustrated in FIG. 1(a), an SCR system 100 mainly includes: an SCR device 103 provided in an exhaust pipe 102 for an engine E; a dosing valve (urea injection device or dosing module) 104 that injects urea solution on the upstream side of the SCR device 103 (upstream side of an exhaust gas); a urea tank 105 that stores urea solution; a supply module ("SM") 106 that supplies urea solution stored in the urea tank 105 to the dosing valve 104 and a DCU (dosing control unit) 126 that controls, e.g., the dosing valve 104 and the supply module 106.

In the exhaust pipe 102 for the engine E, a DOC (diesel oxidation catalyst) 107, a DPF (diesel particulate filter) 108 and the SCR device 103 are sequentially disposed from the upstream side to the downstream side of an exhaust gas. The DOC 107 is provided to oxidize NO in an exhaust gas emitted from the engine E to $NO_2$ to control a ratio between NO and $NO_2$ in the exhaust gas for enhancement in denitration efficiency of the SCR device 103. Also, the DPF 108 is provided to collect PM (particulate matter) in the exhaust gas.

In the exhaust pipe 102 on the upstream side of the SCR device 103, the dosing valve 104 is provided. The dosing valve 104 has a structure in which a cylinder filled with high-pressure urea solution is provided with an injection orifice and a valving element occluding the injection orifice is attached to a plunger, and upon energization of a coil to pull up the plunger, the valving element is moved away from the injection orifice, whereby urea solution is injected. Upon the energization of the coil being stopped, the plunger is pulled down by means of an internal spring force so that the valving element occludes the injection orifice, whereby the injection of urea solution is stopped.

In the exhaust pipe 102 on the upstream side of the dosing valve 104, an exhaust temperature sensor 109 that measures a temperature of an exhaust gas at an entrance of the SCR device 103 (SCR entrance temperature) is provided. Also, on the upstream side of the SCR device 103 (here, the upstream side of the exhaust temperature sensor 109), an upstream-side $NO_x$ sensor 110 that detects an $NO_x$ concentration on the upstream side of the SCR device 103 is provided, and on the downstream side of the SCR device 103, a downstream-side $NO_x$ sensor 111 that detects an $NO_x$ concentration on the downstream side of the SCR device 103 is provided.

The supply module 106 includes: an SM pump 112 that pressure-feeds urea solution; an SM temperature sensor 113 that measures a temperature of the supply module 106 (temperature of urea solution flowing in the supply module 106); a urea solution pressure sensor 114 that measures a pressure of the urea solution in the supply module 106 (pressure on the discharge side of the SM pump 112); and a reverting valve 115 that switches between supply of urea solution from the urea tank 105 to the dosing valve 104 and return of urea solution in the dosing valve 104 to the urea tank 105 by switching between flow passages of urea solution. Here, arrangement is made so that when the reverting valve 115 is off, the urea solution from the urea tank 105 is supplied to the dosing valve 104 and when the reverting valve 115 is on, the urea solution in the dosing valve 104 is returned to the urea tank 105.

When switching of the reverting valve 115 is made so that urea solution is supplied to the dosing valve 104, the supply module 106 sucks up urea solution in the urea tank 105 through a liquid feed line 116 via the SM pump 112 and supplied to the dosing valve 104 through a pressure-feed line 117 and extra urea solution is returned to the urea tank 105 through a collection line 118.

In the urea tank 105, an SCR sensor 119 is provided. The SCR sensor 119 includes: a level sensor 120 that measures a liquid level of urea solution in the urea tank 105; a temperature sensor 121 that measures a temperature of the urea solution in the urea tank 105; and a product quality sensor 122 that measures a product quality of the urea solution in the urea tank 105. The product quality sensor 122 is configured to detect a concentration of urea solution and/or whether a heterogeneous mixture is mixed in the urea solution, based on, for example, an ultrasound propagation speed and/or electrical conductivity to detect a product quality of the urea solution in the urea tank 105.

A cooling line 123 that circulates cooling water for cooling the engine E is connected to the urea tank 105 and the supply module 106. The cooling line 123 runs through the inside of the urea tank 105 for heat exchange between cooling water flowing in the cooling line 123 and urea solution in the urea tank 105. Likewise, the cooling line 123 runs through the inside of the supply module 106 for heat exchange between the cooling water flowing in the cooling line 123 and urea solution in the supply module 106.

In the cooling line 123, a tank heater valve (coolant valve) 124 that provides a switch for whether or not cooling water is supplied to the urea tank 105 and the supply module 106 is provided. Although the cooling line 123 is connected also to the dosing valve 104, arrangement is made so that cooling water is supplied to the dosing valve 104 irrespective of whether the tank heater valve 124 is opened or closed. The cooling line 123 is disposed along the liquid feed line 116, the pressure-feed line 117 and the collection line 118 through which urea solution passes, which is, however, not illustrated in FIG. 1(a) for simplification of the Figure.

Figure 2:
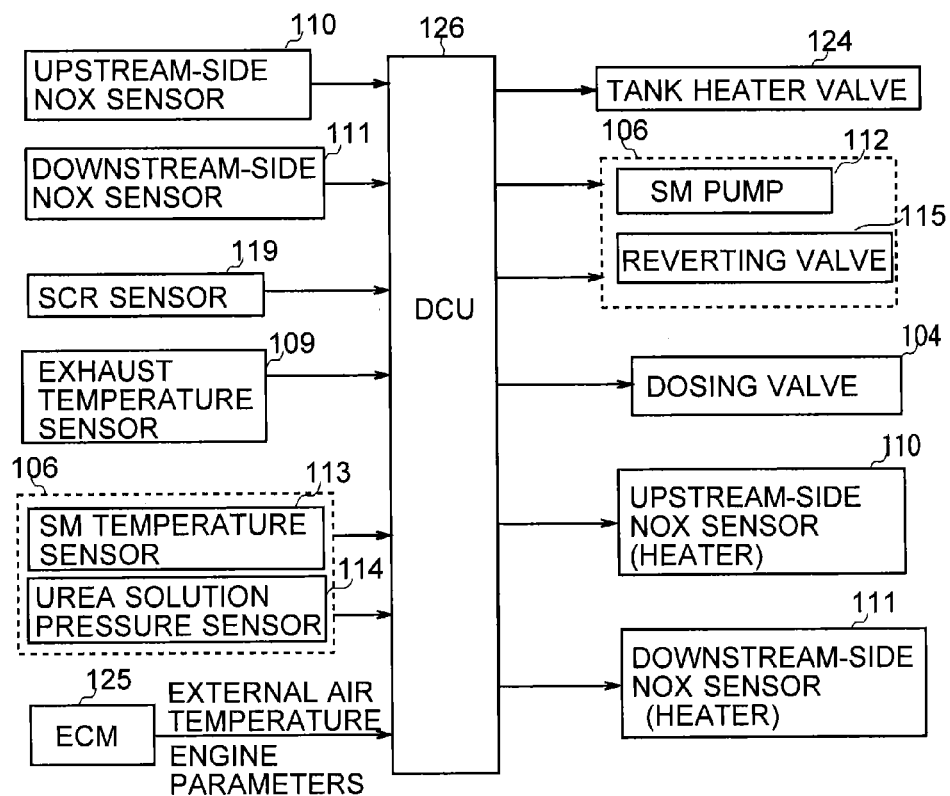
FIG. 2 is a diagram of an input/output configuration of a DCU in the SCR system in FIG. 1.

FIG. 2 is a diagram of an input/output configuration of the DCU 126.

As illustrated in FIG. 2, input signal lines from the upstream-side $NO_x$ sensor 110, the downstream-side $NO_x$ sensor 111, the SCR sensor 119 (the level sensor 120, the temperature sensor 121 and the product quality sensor 122), the exhaust temperature sensor 109, the SM temperature sensor 113 and the urea solution pressure sensor 114 in the supply module 106 and an ECM (engine control module) 125 that controls the engine E are connected to the DCU 126. From the ECM 125, signals for an external air temperature and engine parameters (e.g., engine revolutions, fuel injection quantity, exhaust gas flow and cooling water temperature) are input.

Also, output signal lines to the tank heater valve 124, the SM pump 112 and the reverting valve 115 in the supply module 106, the dosing valve 104, a heater for the upstream-side $NO_x$ sensor 110 and a heater for the downstream-side $NO_x$ sensor 111 are connected to the DCU 126. Here, input/output of signals between the DCU 126 and the respective members may be made via the individual signal lines or a CAN (controller area network).

Figure 1B:
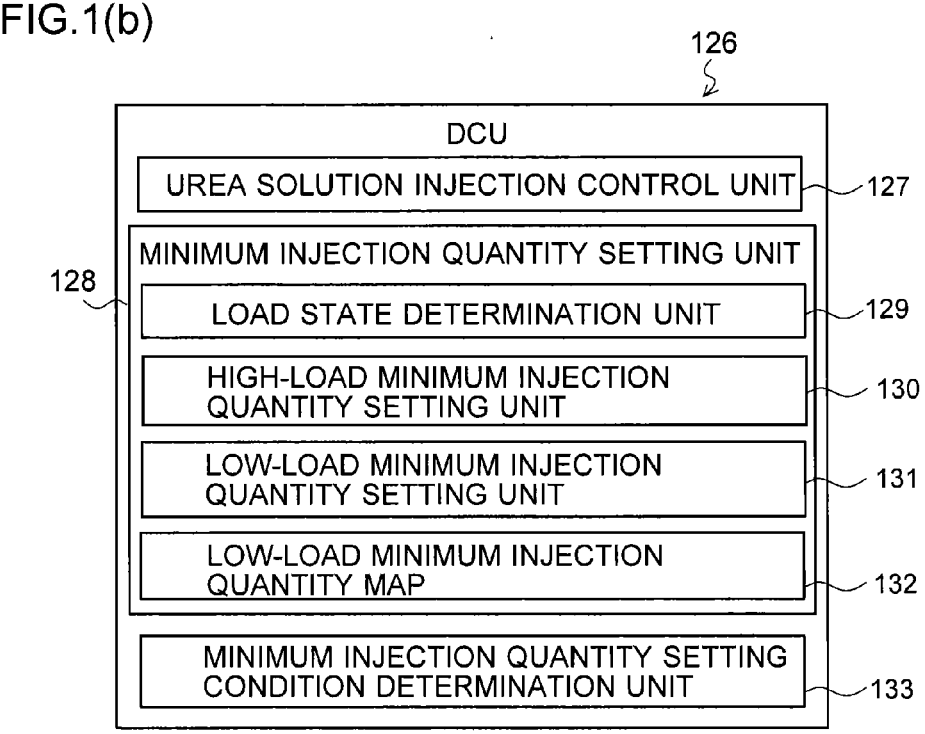

As illustrated in FIG. 1(b), a urea solution injection control unit 127 that controls an injected quantity of urea solution according to a quantity of $NO_x$ emitted from the engine E, is installed in the DCU 126. The urea solution injection control unit 127 is configured to estimate a quantity of $NO_x$ in an exhaust gas (quantity of $NO_x$ emitted from the engine E) based on the signals for the engine parameters from the ECM 125 and a temperature of the exhaust gas from the exhaust temperature sensor 109 and determine a quantity of urea solution to be injected from the dosing valve 104 based on the estimated quantity of $NO_x$ in the exhaust gas, and furthermore, when the determined quantity of urea solution is injected via the dosing valve 104, controls the dosing valve 104 based on a value detected by the upstream-side $NO_x$ sensor 110 to adjust the quantity of urea solution injected via the dosing valve 104.

The SCR system 100 according to the present embodiment further includes a minimum injection quantity setting unit 128 that if a temperature of the dosing valve 104 is equal to or exceeds a predetermined temperature (for example, equal to or exceeding an SCR catalyst activation temperature), sets a minimum injection quantity according to the temperature of the dosing valve 104. In the present embodiment, it is not economical to provide a dedicated temperature sensor for the dosing valve 104, and thus, a value detected by the conventionally-used exhaust temperature sensor 109 (i.e., an exhaust gas temperature or an SCR entrance temperature) is used as the temperature of the dosing valve 104.

Also, in the SCR system 100, the urea solution injection control unit 127 is configured to, if the injected quantity of urea solution according to the quantity of $NO_x$ emitted from the engine E is smaller than the minimum injection quantity set by the minimum injection quantity setting unit 128, controls the quantity of urea solution injected to be the minimum injection quantity. In this case, the urea solution injection control unit 127 performs control so that the minimum injection quantity of the urea solution is successively injected.

The minimum injection quantity setting unit 128 includes a load state determination unit 129 that determines whether an operation state of the engine E is a high-load operation state or a low-load operation state, a high-load minimum injection quantity setting unit 130 that sets a high-load minimum injection quantity, and a low-load minimum injection quantity setting unit 131 that sets a low-load minimum injection quantity.

The load state determination unit 129, if a fuel injection quantity is equal to or exceeds a fuel injection quantity threshold value calculated from the exhaust gas temperature, determines that the operation state of the engine E is a high-load operation state, and if the fuel injection quantity is less than the fuel injection quantity threshold value, determines that the operation state of the engine E is a low-load operation state.

Although in the present embodiment, a load state of the engine E is determined by the load state determination unit 129 from the fuel injection quantity, the method of the determination according to the present invention is not limited to this, and a load state of the engine E may be determined from, for example, the exhaust gas flow. In this case, the load state determination unit 129, if the exhaust gas flow is equal to or exceeds a predetermined threshold value, determines that the operation state of the engine E is a high-load operation state, and if the exhaust gas flow is less than the predetermined threshold value, determines that the operation state of the engine E is a low-load operation state. For the exhaust gas flow, an intake air flow measured by a mass air flow sensor (MAF sensor) provided in an air intake pipe of the engine may be used.

The high-load minimum injection quantity setting unit 130, if the load state determination unit 129 determines that the operation state of the engine is a high-load operation state, sets a high-load minimum injection quantity so as to meet expression (1) below:

$$x_4 \geq (y_0 - ax_1 - bx_2 - cx_3 - e)/d \qquad (1),$$

where $x_1$ is an exhaust gas flow, $x_2$ is an exhaust gas temperature $x_3$ is a cooling water temperature $y_0$ is a urea solution temperature at which no trouble occurs, and a to e are coefficients.

The coefficients a to e and the urea solution temperature $y_0$ at which no trouble occurs in expression (1) are arbitrarily determined by, e.g., experiment. The urea solution temperature $y_0$ at which no trouble occurs may be set to, for example, a value equal to or below a boiling point temperature of urea solution.

Although in the present embodiment, the high-load minimum injection quantity is obtained by expression (2) below, $$x_4 = (y_0 - ax_1 - bx_2 - cx_3 - e)/d \qquad (2),$$

it is only necessary that the high-load minimum injection quantity be equal to or exceeds $(y_0 - ax_1 - bx_2 - cx_3 - e)/d$ and may arbitrarily be set so as to prevent the minimum injection quantity from becoming too large, resulting in occurrence of ammonia slip. Ammonia slip refers to a phenomenon in which ammonia generated from urea solution is not fully absorbed by the SCR catalyst, resulting in ammonia flowing to the downstream side of the SCR device 103.

Here, a basis for expression (1) will be described.

A urea solution temperature y in the dosing valve 104 is affected by four parameters, the exhaust gas flow $x_1$, the exhaust gas temperature $x_2$, the cooling water temperature $x_3$ and the urea solution injection quantity $x_4$. Accordingly, the urea solution temperature y can be represented by a regression equation expressed by expression (3) below using these four parameters $x_1$ to $x_4$:

$$y = ax_1 + bx_2 + cx_3 + dx_4 + e \qquad (3).$$

Here, where the urea solution temperature y is substituted with the urea solution temperature $y_0$ at which no trouble occurs, to change expression (3), expression (2) above can be obtained. The urea solution injection quantity $x_4$ obtained by expression (2) represents a minimum urea solution injection quantity to be secured to prevent occurrence of troubles (thermal damage such as a failure in operation and corrosion of the dosing valve 104). Accordingly, occurrence of troubles can be prevented by making the minimum injection quantity be equal to or exceeding the urea solution injection quantity $x_4$ obtained by expression (2) (that is, setting the minimum injection quantity so as to satisfy the condition of expression (1)).

Meanwhile, the low-load minimum injection quantity setting unit 131 is configured to, if the load state determination unit 129 determines that the operation state of the engine E is a low-load operation state, set a low-load minimum injection quantity with reference to a low-load minimum injection quantity map 132 in which low-load minimum injection quantities are provided for each exhaust gas flow and each exhaust gas temperature. When no load is provided, no $NO_x$ is emitted and thus injection of urea solution is normally stopped; however, in the present embodiment, as long as the exhaust gas temperature (temperature of the dosing valve 104) is equal to or exceeds the predetermined temperature, the low-load minimum injection quantity of urea solution, which is set by the low-load minimum injection quantity setting unit 131, is injected.

Here, the low-load minimum injection quantity is set to a value smaller than the high-load minimum injection quantity. This is because, when a low load (or no load) is provided, the exhaust gas flow is lowered and thus, if a large quantity of urea solution is injected, the urea solution is not decomposed by ammonia and adheres to the exhaust pipe 102, which may cause troubles such as corrosion of the exhaust pipe 102. In order to prevent such troubles, in the present embodiment, different minimum injection quantities are set for a high-load state and a low-load state.

Also, in the present embodiment, the low-load minimum injection quantity map 132 is set so that the minimum injection quantity is 0 (zero) in a region of a temperature lower than the predetermined temperature. This is because, where a low load (or no load) is provided, the exhaust gas flow is lowered and thus, if the exhaust gas temperature is not sufficiently high, urea solution cannot be decomposed by ammonia, which may cause troubles such as corrosion of the exhaust pipe 102.

Also, the SCR system 100 according to the present embodiment further includes a minimum injection quantity setting condition determination unit 133 that permits the setting of the minimum injection quantity by the minimum injection quantity setting unit 128 only if any of minimum injection quantity setting conditions (1) to (4) indicated below is met. The minimum injection quantity setting unit 128 is configured to, if the setting of the minimum injection quantity is not permitted, set the minimum injection quantity to 0 (zero) (that is, set no minimum injection quantity).

(1) When a low load is provided;
(2) When DPF regeneration is underway;
(3) When the injected quantity of urea solution is reduced to be smaller than the injection quantity according to the quantity of $NO_x$ emitted from the engine E for ammonia slip suppression; and
(4) When the injected quantity of urea solution is smaller than the urea solution injection quantity threshold value calculated from the exhaust temperature.

Minimum injection quantity setting conditions (1) to (4) above each indicate a condition in which the temperature of urea solution in the dosing valve 104 becomes high, which easily causes troubles, and limit situations in which the setting of the minimum injection quantity by the injection quantity setting unit 128 is employed. For example, (1) when a low load is provided, the injected quantity of urea solution becomes low and the quantity of urea solution supplied to the dosing valve 104 thereby decreases, and thus, a cooling effect provided by the urea solution supplied to the dosing valve 104 is lowered, and (2) when DPF regeneration is underway, the exhaust gas temperature becomes high and thus, the temperature of urea solution in the dosing valve 104 easily becomes high.

Where minimum injection quantity setting condition (3) or (4) is met, the injected quantity of urea solution is low and the cooling effect provided by the urea solution supplied to the dosing valve 104 is thereby lowered. The urea solution injection control unit 127 performs control to reduce the injected quantity of urea solution for ammonia slip suppression, e.g., when the temperature of cooling water is high or low, when the atmospheric pressure is low, when the quantity of $NO_x$ ($NO_x$ flow) is high or when the EGR (exhaust gas recirculation) quantity is lowered, and in such case, minimum injection quantity setting condition (3) is met.

Where no minimum injection quantity setting conditions are set, if the exhaust gas temperature (temperature of the dosing valve 104) is equal to or exceeds the predetermined temperature, urea solution is consistently injected and thus ammonia slip may occur depending on the operation condition and/or the environmental condition; however, as a result of setting minimum injection quantity setting conditions to limit situations in which setting of a minimum injection quantity is employed, occurrence of ammonia slip can be suppressed. Here, the minimum injection quantity setting conditions are not limited to (1) to (4) above and may be arbitrarily be set.

Next, an operation of the SCR system 100 will be described with reference to FIG. 3. In the SCR system 100, the control flow in FIG. 3 is repeatedly executed.

Figure 3:
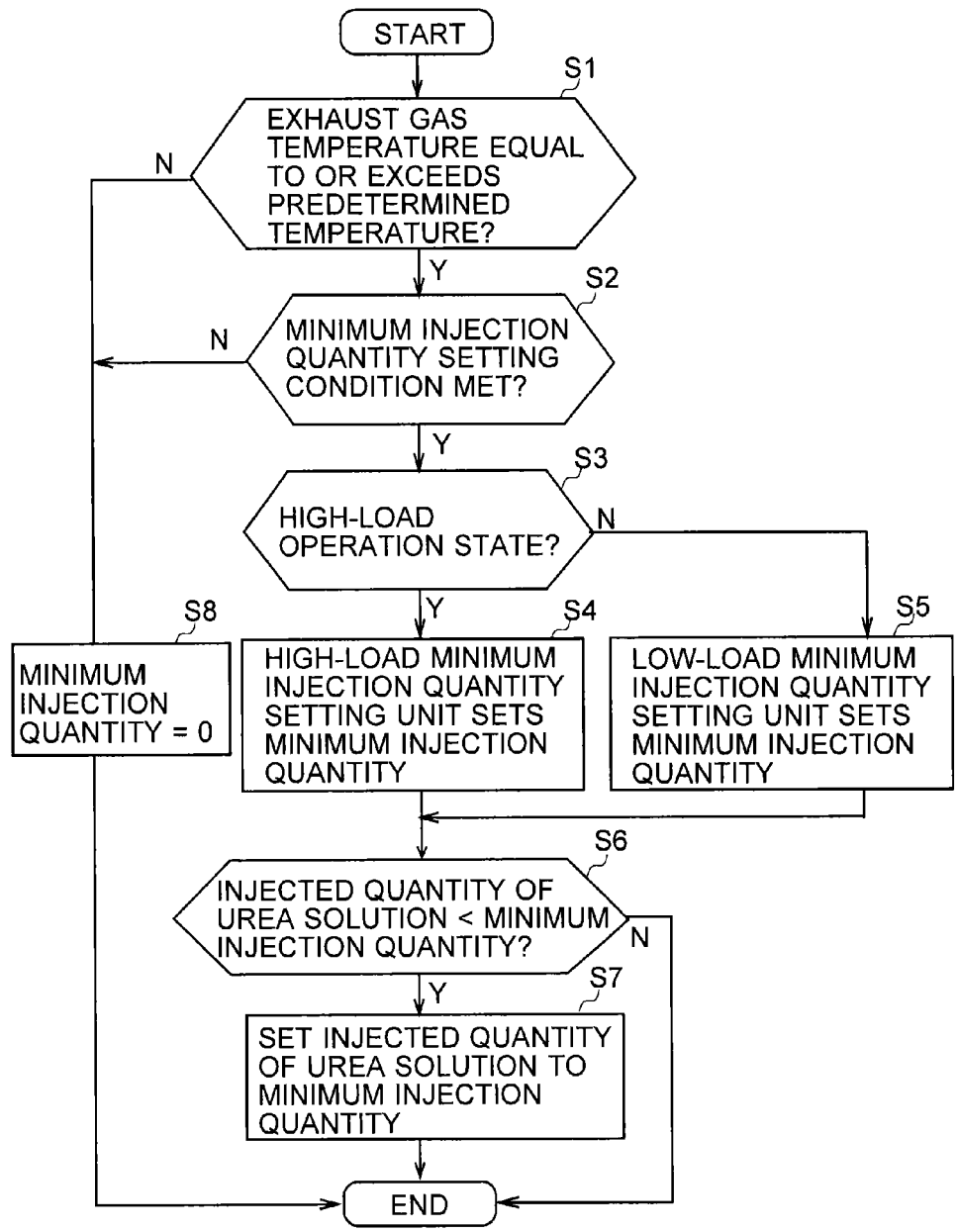
FIG. 3 is a flowchart illustrating a control flow for the SCR system in FIG. 1.
Figure 6:
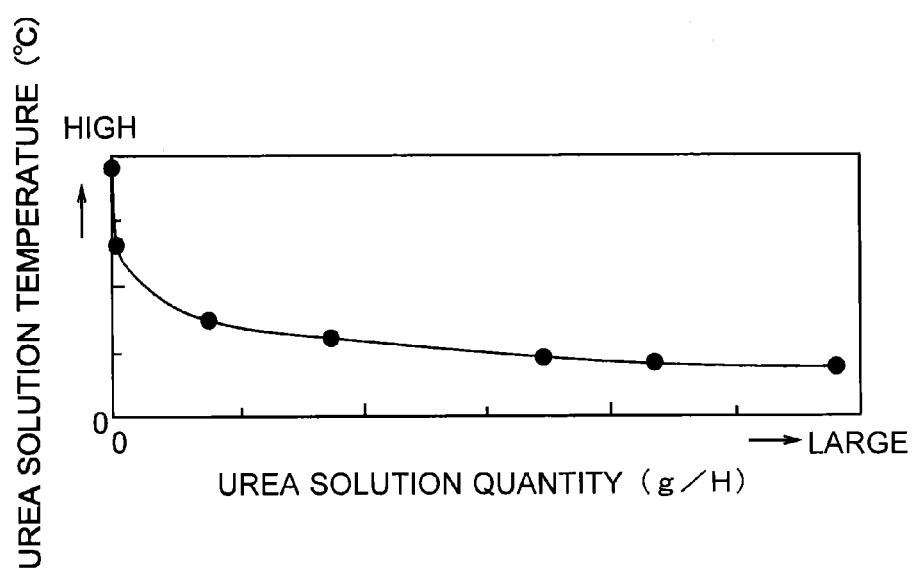
FIG. 6 is a graph indicating a relationship between injected quantity of urea solution and temperature of urea solution in a dosing valve.

As illustrated in FIG. 3, first, in step S1, the minimum injection quantity setting unit 128 determines whether or not the exhaust gas temperature (temperature of the dosing valve 104) is equal to exceeds the predetermined temperature. If the result of the determination in step S1 is NO, the minimum injection quantity setting unit 128 set the minimum injection quantity to 0 (step S8) and the control is ended.

If the result of the determination in step S1 is YES, in step S2, the minimum injection quantity setting condition determination unit 133 determines whether or not any of minimum injection quantity setting conditions (1) to (4) above is met. If the result of the determination in step S2 is NO, the minimum injection quantity setting unit 128 sets the minimum injection quantity to 0 (step S8) and the control is ended.

If the result of the determination in step S2 is YES, in step S3, the load state determination unit 129 determines whether or not the operation state of the engine E is a high-load operation state.

If the result of the determination in step S3 is YES, the operation state of the engine E is a high-load operation state, and thus, in step S4, the high-load minimum injection quantity setting unit 130 sets a high-load minimum injection quantity using expression (2) above. Subsequently, the control proceeds to step S6.

If the result of the determination in step S3 is NO, the operation state of the engine E is a low-load operation state, and thus, in step S5, the low-load minimum injection quantity setting unit 131 sets a low-load minimum injection quantity with reference to the low-load minimum injection quantity map 132 in terms of the exhaust gas flow and the exhaust gas temperature. Subsequently, the control proceeds to step S6.

In step S6, the urea solution injection control unit 127 determines whether or not the injected quantity of urea solution according to the quantity of $NO_x$ emitted from the engine E is smaller than the minimum injection quantity set in step S4 or step S5. If the result of the determination in step S6 is NO, the result means that a sufficient injected quantity of urea solution is secured, and thus, the control is ended in such state.

If the result of the determination in step S6 is YES, in step S7, the urea solution injection control unit 127 sets (changes) the injected quantity of urea solution to the minimum injection quantity set in step S4 or step S5. Subsequently, the control is ended.

As described above, the SCR system 100 according to the present embodiment includes the minimum injection quantity setting unit 128 that if a temperature of the dosing valve 104 is equal to or exceeds the predetermined temperature, sets a minimum injection quantity according to the temperature of the dosing valve 104, and is configured to, if an injected quantity of urea solution according to a quantity of $NO_x$ emitted from the engine E is smaller than the minimum injection quantity set by the minimum injection quantity setting unit 128, makes the urea solution injection control unit 127 control the injected quantity of urea solution to the minimum injection quantity.

Consequently, the minimum injection quantity of urea solution according to the temperature of the dosing valve 104 can be secured, enabling the temperature of the urea solution in the dosing valve 104 to be maintained to be low. Accordingly, thermal damage such as a failure in operation and/or corrosion of the dosing valve 104 can be suppressed, enabling proper urea solution injection control to be performed.

Furthermore, in the SCR system 100, different minimum injection quantities are employed for a high-load state and a low-load state, enabling prevention of troubles such as corrosion of the exhaust pipe 102 as a result of a large quantity of urea solution being injected when a low load is provided.

Furthermore, in the SCR system 100, only if any of minimum injection quantity setting conditions (1) to (4) above is met, setting of a minimum injection quantity by the minimum injection quantity setting unit 128 is permitted, and thus, situations in which setting of a minimum injection quantity is employed are limited, enabling suppression of ammonia slip occurring as a result of urea solution being consistently injected.

The present invention is not limited to the above embodiments, and it should be understood that various alterations are possible without departing from the spirit of the present invention.

For example, although there has been described a case where a high-load minimum injection quantity is set so as to satisfy expression (1), the present invention is not limited to this case, and it is only necessary that a high-load minimum injection quantity be set at least according to the temperature of the dosing valve 104 (exhaust gas temperature). For example, a high-load minimum injection quantity may be calculated by subjecting a basic injection quantity calculated based on an exhaust gas temperature and an exhaust gas flow to a correction according to an engine revolutions and a fuel injection quantity.

Also, although there has been described a case where a set minimum injection quantity of urea solution is successively injected, the present invention is not limited to this case, and urea solution may be intermittently injected by repeating injection of urea solution for a predetermined period of time (for example, 30 seconds) and subsequent stoppage of injection of urea solution for a predetermined period of time (for example, 60 seconds). Consequently, the injected quantity of urea solution can be reduced, enabling more reliable ammonia slip suppression.

The invention claimed is:

1. A selective catalytic reduction system, comprising:
a selective catalytic reduction device provided in an exhaust pipe for an engine;
a dosing valve that injects urea solution on an upstream side of the selective catalytic reduction device; and
a urea solution injection control unit that controls an injected quantity of the urea solution according to a quantity of $NO_x$ emitted from the engine,
wherein the selective catalytic reduction system includes a minimum injection quantity setting unit that if a temperature of the dosing valve is equal to or higher than a predetermined temperature, sets a minimum injection quantity according to the temperature of the dosing valve,
wherein the minimum injection quantity setting unit includes a load state determination unit that determines whether an operation state of the engine is a high-load operation state or a low-load operation state, and a high-load minimum injection quantity setting unit that, if the load state determination unit determines that the operation state of the engine is the high-load operation state, sets a high-load minimum injection quantity so as to satisfy expression (1) below, and
wherein the urea solution injection control unit is configured to, if the injected quantity of urea solution according to the quantity of $NO_x$ emitted from the engine is smaller than the minimum injection quantity set by the minimum injection quantity setting unit, control the injected quantity of urea solution to be the minimum injection quantity:

$$x_4 \geq (y_0 - ax_1 - bx_2 - cx_3 - e/d) \quad (1),$$

where
$x_1$ is an exhaust gas flow,
$x_2$ is an exhaust gas temperature,
$x_3$ is a cooling water temperature,
$y_0$ is a urea solution temperature at which no trouble occurs, and
a to e are coefficients.

2. The selective catalytic reduction system according to claim 1, wherein the load state determination unit, if a fuel injection quantity is equal to or higher than a fuel injection quantity threshold value calculated from the exhaust gas temperature, determines that the operation state of the engine is the high-load operation state, and, if the fuel injection quantity is less than the fuel injection quantity threshold value, determines that the operation state of the engine is the low-load operation state.

3. The selective catalytic reduction system according to claim 1, further comprising:

a minimum injection quantity setting condition determination unit that permits the setting of the minimum injection quantity by the minimum injection quantity setting unit only if a predetermined minimum injection quantity setting condition is met, wherein, if the setting of the minimum injection quantity is not permitted, the minimum injection quantity setting unit sets the minimum injection quantity to 0 (zero).

4. The selective catalytic reduction system according to claim 2, further comprising:

a minimum injection quantity setting condition determination unit that permits the setting of the minimum injection quantity by the minimum injection quantity setting unit only if a predetermined minimum injection quantity setting condition is met, wherein, if the setting of the minimum injection quantity is not permitted, the minimum injection quantity setting unit sets the minimum injection quantity to 0 (zero).

5. A selective catalytic reduction system, comprising:

a selective catalytic reduction device provided in an exhaust pipe for an engine;

a dosing valve that injects urea solution on an upstream side of the selective catalytic reduction device; and a urea solution injection control unit that controls an injected quantity of the urea solution according to a quantity of NOx emitted from the engine, wherein the selective catalytic reduction system includes a minimum injection quantity setting unit that, if a temperature of the dosing valve is equal to or higher than a predetermined temperature, sets a minimum injection quantity according to the temperature of the dosing valve, and wherein the urea solution injection control unit is configured to, if the injected quantity of urea solution according to the quantity of NOx emitted from the engine is smaller than the minimum injection quantity set by the minimum injection quantity setting unit, control the injected quantity of urea solution to be the minimum injection quantity; and a minimum injection quantity setting condition determination unit that permits the setting of the minimum injection quantity by the minimum injection quantity setting unit only if a predetermined minimum injection quantity setting condition is met, wherein the minimum injection quantity setting condition includes when the injected quantity of urea solution is reduced to be smaller than the injection quantity according to the quantity of NOx emitted from the engine for ammonia slip suppression.

* * * * *